United States Patent [19]

Ziolko

[11] 4,420,856
[45] Dec. 20, 1983

[54] APPARATUS FOR PROCESSING STUFFED SAUSAGE CASING

[75] Inventor: Francis J. Ziolko, Bridgewater, N.J.

[73] Assignee: Devro, Inc., Somerville, N.J.

[21] Appl. No.: 500,204

[22] Filed: Jun. 1, 1983

Related U.S. Application Data

[62] Division of Ser. No. 279,895, Jul. 2, 1981.

[51] Int. Cl.³ .............................................. A22C 11/00
[52] U.S. Cl. .......................................................... 17/34
[58] Field of Search ............................... 17/34, 33, 1 F

[56] References Cited

U.S. PATENT DOCUMENTS

| 3,220,052 | 11/1965 | Heydn | 17/34 |
| 3,382,745 | 5/1968 | Trimble | 17/34 X |
| 3,435,482 | 4/1969 | Ziolko | 17/34 |
| 3,500,743 | 3/1970 | Cameron | 17/34 X |

Primary Examiner—Willie G. Abercrombie
Attorney, Agent, or Firm—Michael Q. Tatlow

[57] ABSTRACT

An apparatus for forming or separating sausage links is disclosed. The apparatus has a series of pairs of forming arms mounted on a circular plate. The arms are moved into contact with the sausage casing at sequentially spaced points along the length of the casing. As a pair of forming arms contact the casing from opposite sides of the casing, they force the food emulsion within the casing away from the point of contact forming a link end. A stabilizer affixed to the forming arms guides the casing into the forming arms.

5 Claims, 33 Drawing Figures

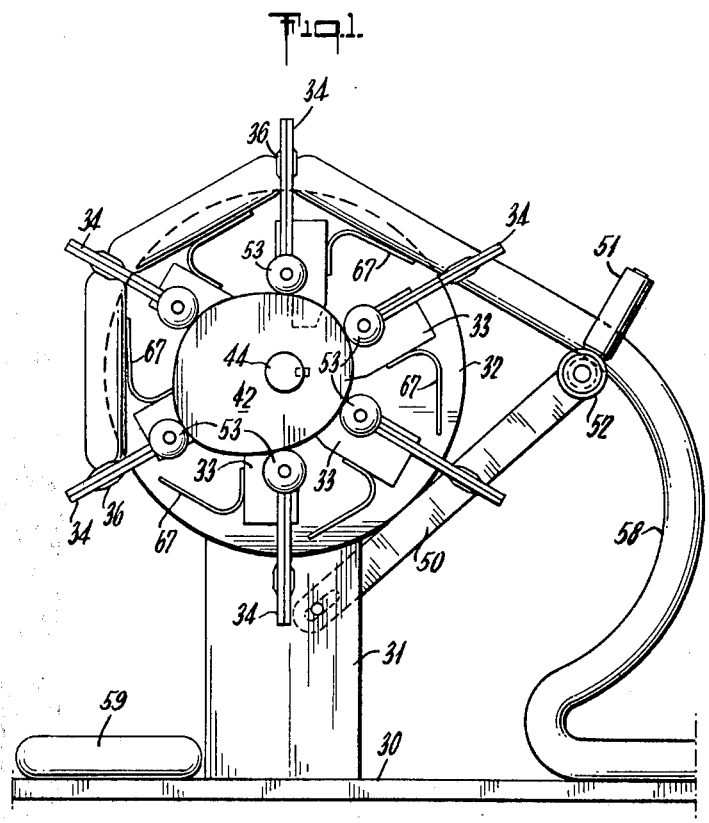

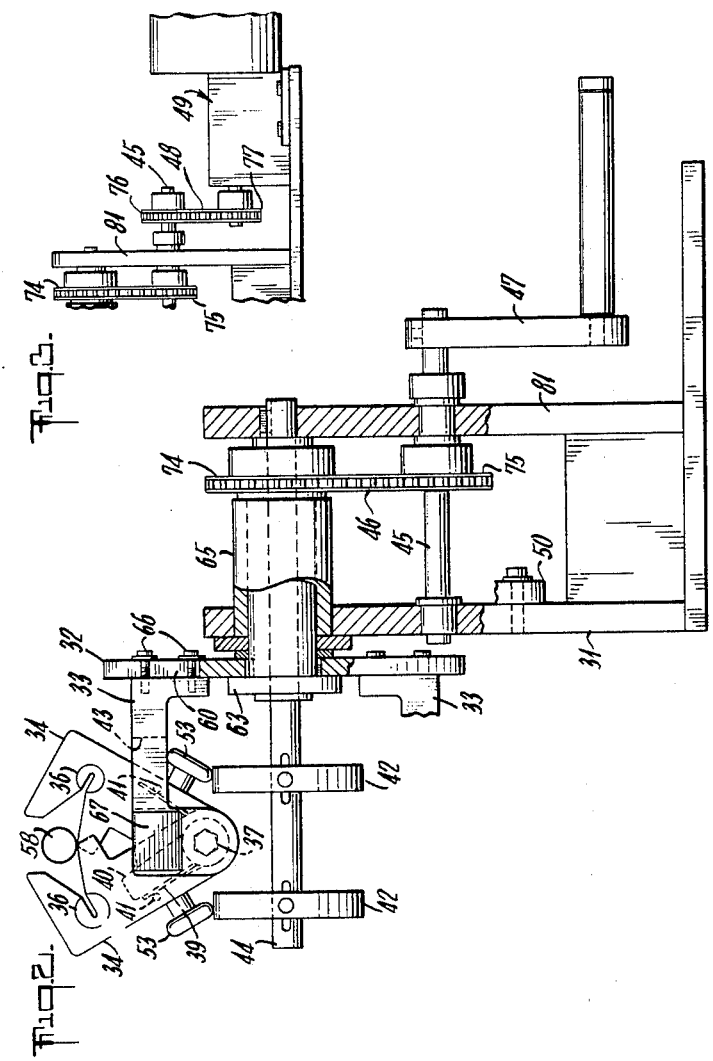

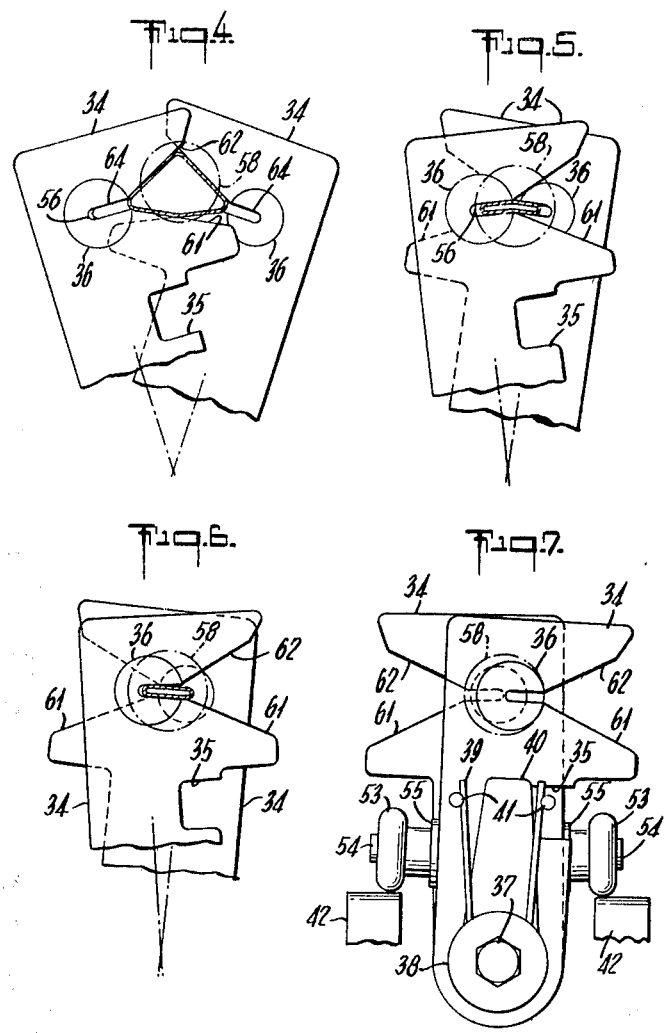

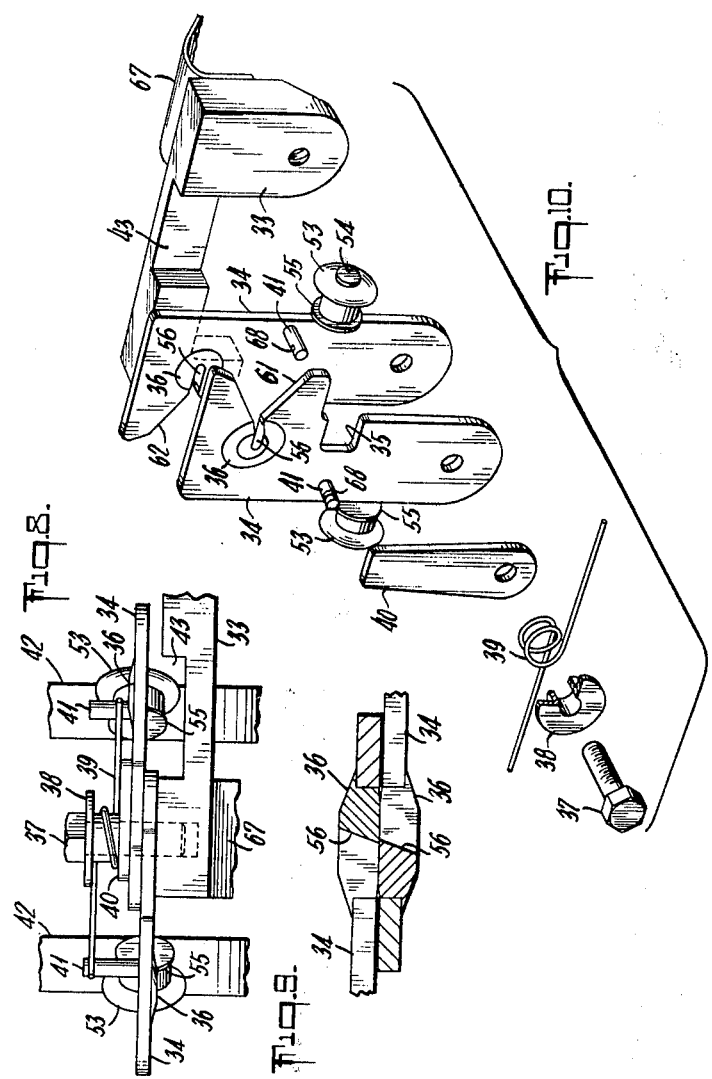

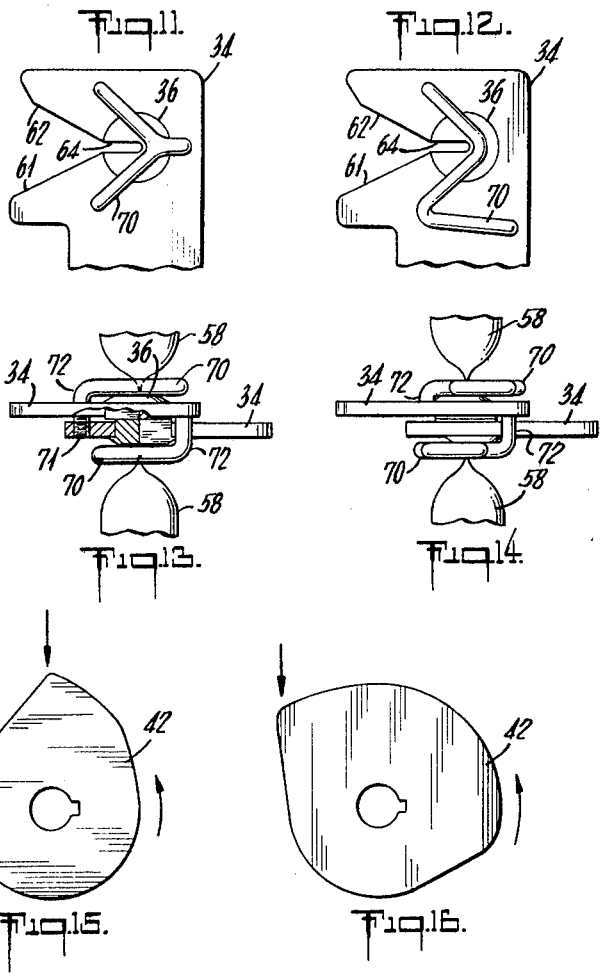

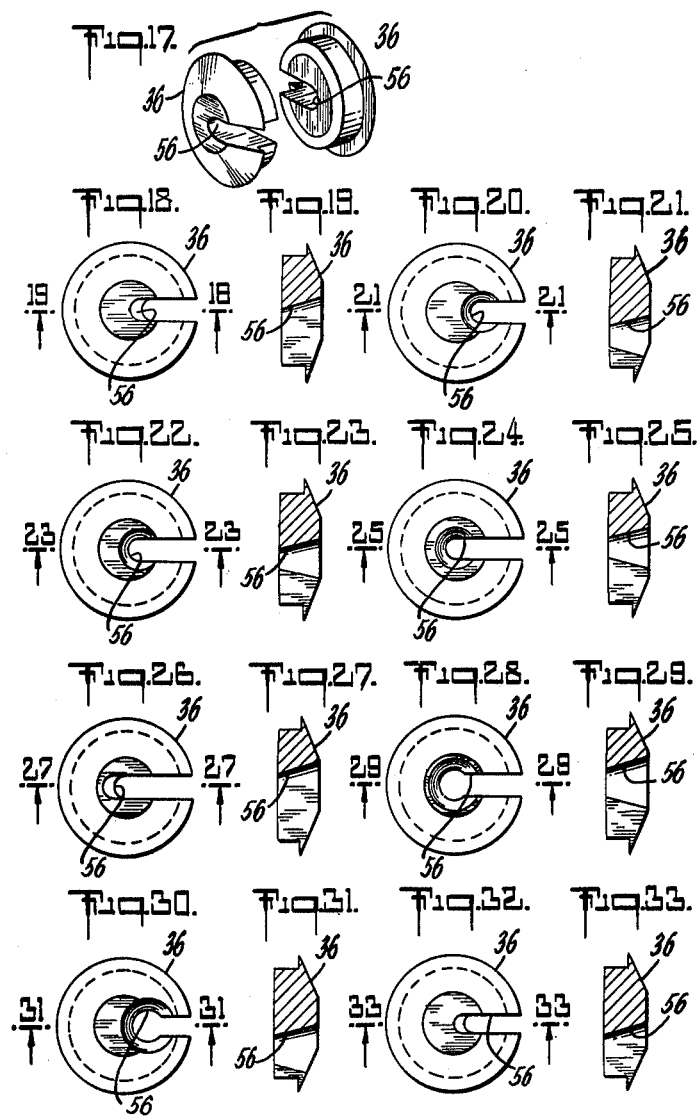

APPARATUS FOR PROCESSING STUFFED SAUSAGE CASING

This application is a divisional of application Ser. No. 279,895 filed July 2, 1981.

BACKGROUND OF THE INVENTION

1. The Field of the Invention

The present invention relates to a method and apparatus for processing sausage. The invention may be used for linking stuffed casing to form individual sausages of uniform length and separating the individual sausage links and may also be used to separate sausage links which have been formed by other apparatus.

2. Prior Art

Machines for automatically linking a filed sausage casing having been in use for some time. These machines normally function by a twisting process in which a portion of the filled casing is pinched at intervals along its length, and the casing is twisted to form an individual link. As the casing is twisted, the meat emulsion or other filling material in the casing is forced away from the twisted portion of the casing, thereby forming individual links. Machines of this type are described in U.S. Pat. Nos. 1,866,497; 3,435,482; 2,663,982; 3,191,222; 3,264,679; 3,971,101 and 4,073,039. There are also numerous other patents which disclose specific mechanisms for accomplishing the same result. In these twisting processes, the meat emulsion or other filling material within the casing is forced from the end of the link because of the reduction in the size of the casing as it is twisted. This twisting process puts significant amounts of stress on the casing material, and there is a tendency for the casing material to break as it is twisted. Although these twisting processes have been found to be commercially acceptable when using casings made from materials having high tensile strength, such as cellulose, the twisting process causes some problems with natural casings, such as animal intestines, and with collagen casing materials. These materials do not have the tensile strength of the cellulose casing material, and there is a greater tendency for the casing to tear or break, thus, causing unaccepatable products and waste.

In addition, the twisting machinisms used to form the links are quite complicated and expensive. Because of the complexity of these machines, the machines are difficult to clean and maintain in a sanitary condition. The complexity also results in excessive maintenance and repair costs. In order to form sausage links of a different length, it is necessary to replace a significant portion of the machine, which leads to a high cost for parts. The machines also require extensive down time to convert the machines in the event the sausage producer desires to produce sausage links of a different length. The twisting machines also cannot form links from small diameter, i.e., less than 16 mm., stuffed casing.

Commercially available linking machines using a twisting mechanism occupy a large amount of floor space in refrigerated processing areas. As refrigerated space in commercial sausage operations is expensive, linking machines of a smaller size are desirable.

Production of links of uniform length by a twisting mechanism requires that a standard amount of twist be imparted to each sausage and that the filling of the sausage casing be uniform. Prior art twisting mechanisms have a tendency to produce links of various lengths. This occurs because of variations in the stuffing of the sausage casings and the variations in twisting imparted by the machine. If the casing is underfilled, then more casing is gathered in the twist, and a shorter link results. If overfilled, a longer link results. Sausage emulsion characteristics also have an effect on length. As an example, high viscosity filling reduces the twisting efficiency of the machine resulting in longer links.

The forming of sausage links without twisting has been disclosed in U.S. Pat. Nos. 3,059,272; 3,208,099; 3,209,396; 3,220,053 and 3,228,060. In the process disclosed in these patents, a plurality of stuffed casings are contacted with a series of slated bars mounted on a conveyor. The casing is forced into the slots and constricted to form individual links. The formed links are carried by the conveyor through various processing steps to cook or cure the sausage. The attached links are removed from the conveyor, and the casing is removed from the links, thereby freeing individual sausages. This process is intended to be used with high tensile strength casings of the cellulose type.

In some sausage processes, the links are cooked and further processed in a continuous chain of links. The chain must be cut into individual links in a separate step. Existing apparatus employed to cut the preformed links into separate links are quite complicated considering the operation that they perform. These machines often do not properly register their cutting mechanism with the length of the link and, therefore, cut the sausage link itself rather than cutting the twisted casing between adjacent links. These machines often employ complicated and expensive electric-eye sensors and other technically sophisticated mechanisms. Even when the indexing is proper, cutting occurs indiscriminately at any point between adjacent links. Aesthetically it is better to center the cut between links so that equal amounts of the twist are left on either end.

SUMMARY OF THE INVENTION

The present invention relates to a very simple and uncomplicated sausage linking and separating apparatus. The apparatus has very few moving parts and does not require a twisting mechanism to form individual sausage links. The present apparatus forms individual links by contacting the casing with forming elements which apply pressure to the casing to form a link end. Additional pressure is then asserted against the link end to force the filling material in the casing away from the link end to prevent excess stress on the end of the link. This results in fewer tears or breaks in the casing. The forming elements have a cutting area in the elements, so that after the link is completely formed, the cutting elements can be brought into operation to sever a completed link from the adjacent link in the casing.

As there is no twisting mechanism in the present apparatus, the stress that causes breaks and tears in the casing is reduced. Because of the reduction in the number of breaks, the present apparatus can be readily used with sausages stuffed into collagen casing materials without significant breakage of the casing.

A further advantage of the elimination of the twisting is the ability to produce links of more uniform length. The present apparatus is also simple. It occupies a small space, is less expensive to operate and maintain and requires fewer parts and effort to change link length. A further advantage is the inherent ability to link and cut the smallest diameter casings. An additional advantage derived from the simplicity of the apparatus is the ability to maintain the apparatus in a sanitary condition.

The apparatus can also be used to sever individual links from a connected string of links which have been produced by other linking machines. The cut-off portion of the twist can be divided evenly between adjacent links.

BRIEF DESCRIPTION OF THE DRAWINGS

FIG. 1 is a side elevation view of the apparatus of the present invention.

FIG. 2 is an end view of the apparatus of the present invention, partially in cross-section, and showing a pair of forming elements in a fully opened position.

FIG. 3 is a modification of the apparatus of FIG. 2 showing a motor-driven drive mechanism for the apparatus.

FIGS. 4-7 show the position of the forming and cutting elements at various stages in the linking cycle.

FIG. 8 is a top view of the forming and cutting elements of the present invention shown in the opened position.

FIG. 9 is an enlarged cross-sectional view of the forming and cutting insert in the forming elements employed in the present apparatus. They are shown in the cut position.

FIG. 10 is an exploded assembly view of the pair of forming and cutting elements of the present apparatus.

FIGS. 11 and 12 are side views showing modifications of the forming and cutting arms to include alignment stabilizers to position the casing and assist in forming the link end.

FIG. 13 is a top view, partially in section, of a pair of the forming and cutting arms of the construction shown in FIG. 11.

FIG. 14 is a top view of a pair of the forming and cutting arms of the construction shown in FIG. 12.

FIG. 15 is a plan view of a cam which may be used in the present apparatus when the apparatus is employed to sever preformed sausage links.

FIG. 16 is a plan view of a cam which may be used when the present apparatus is used to form and sever sausage links.

FIG. 17 is a detailed view showing the forming and cutting insert employed in the present apparatus.

FIGS. 18-33 show various embodiments of the forming and cutting insert that is used in the present apparatus. The odd numbered drawing in each consecutive numbered pair of drawings showing a cross-sectional view of the insert shown in the even numbered drawing.

DETAILED DESCRIPTION OF THE INVENTION

As depicted in FIG. 1 and FIG. 2, the apparatus of the present invention has a base 30 upon which are suitably mounted supports, one of which is shown in FIG. 1 as element 31. Movably attached to the support is a mounting means in the form of a plate or a disc 32 upon which are mounted brackets 33 with a series of pairs of forming arms 34 affixed to the brackets. These forming arms are capable of being moved into an open or closed position as they are rotated around a stationary shaft 44 upon which is mounted a pair of cams 42, one of which is shown in FIG. 1. There are cam followers associated with each of the forming arms to move the forming arms to open and close them in a manner determined by the shape of the cam. Stuffed sausage casing 58 is fed between a pair of upright roller guides 51 (one of which is shown in FIG. 1) and a horizontal roller guide 52, which are mounted to the support 31 through an adjustable casing support arm 50 and then into the space defined by a pair of open forming arms. As the mounting plate is rotated by hand or through a motor-driven mechanism, a pair of forming arms will open and close according to the high and low points on the cams 42. The sausage casing is fed into the forming arms, and, as the forming arms are carried around the centerline of the machine, which is through the stationary shaft 44, the cams 42 force the forming arms together forming individual sausage links.

The driving mechanism to rotate the mounting plate is shown in FIG. 2. The mounting plate 32 is keyed into a collar 63 which is mounted on free turning bearings on shaft 44. The shaft 44 is mounted on the supports 31 and 81 so that the shaft is fixed and the collar 63 is capable of rotating around the shaft. There is a chain 46 attached to the collar 63 through a suitable sprocket 74 and the chain is also attached to suitable sprocket 75 attached to rotating shaft 45. There is a crank 47 affixed to the shaft 45 and, upon rotation of the crank 47, the collar 63 is rotated by the chain 46 to turn the mounting plate 32 in a circular or endless motion. There is a stationary external bushing and safety cover 65 over the collar 63.

There are a series of support brackets 33 affixed to the mounting plate 32. One end of these brackets is affixed in a slot 60 by bolts 66 in the mounting plate in such a fashion that they may be moved along the radius of the mounting plate. Attached to the other end of each bracket are a pair of forming arms 34. It should be understood that the number of pairs of forming arms that can be attached to a mounting plate depends on the diameter of the mounting plate and the desired distance between adjacent pairs of forming arms. The distance between adjacent pairs of forming arms will determine the length of the link to be made by the apparatus. By moving the support brackets radially outward on the mounting plate, it is possible to adjust the length of the link to be made. Moving the brackets radially outward on the mounting plate will increase the length of the link as it will increase the respective distance between adjacent pairs of forming arms. Conversely, moving the support brackets radially inward on the mounting plate will reduce the length of the sausage link to be made. It is also to be understood that when sausage links of a different length are to be made, the cams 42, which are keyed to the shaft 44, must also be be changed to insert larger or smaller cams, depending on whether longer or shorter sausage links are desired. Each of the forming arms 34 is made of relatively thin metal or plastic. The forming arms have an opening which is preferably a V-shaped as best shown in FIGS. 2 and 7. The particular shape of the opening is not critical. A V-shaped opening is shown in the drawings, but the opening may be semicircular, semielliptical or another geometric configuration. The opening in a forming arm must face the corresponding opening in the other forming arm in the same forming arm pair to allow the stuffed casing to be fed between the open forming arms. In the preferred form of the apparatus, the openings in the forming arms have the same shape or configuration. However, it is possible for the openings in a pair of arms to be of a different shape or to have an opening in only one of the forming arms in a pair. The other forming arm in a pair would have a flat surface on the edge of the arm facing the opening. The link end is formed by the casing being forced into the opening in the one forming arm by the flat surface of the other forming arm.

There is a slot 64 at the base of each opening which may be punched or formed directly in the arm or may be a formed in a removable insert 36 which is force fitted into each arm. There may be a flat deflector plate 67 attached to each of the brackets 33 to assist in guiding the casing to the forming arms and to prevent the casing or meat emulsion from falling onto the cams 42.

If it is desired, it is possible to power drive the shaft 45 as shown in FIG. 3. The crank is removed from the shaft 45, and a motor 49 is attached through suitable sprockets 76 and 77 and drive chain 48 to the shaft 45 to turn collar 98 and mounting plate 32 in the same manner as explained above.

The assembly of each pair of forming arms is best shown in the exploded view of FIG. 10. The forming and cutting arms are attached to a mounting bracket 33 by means of a bolt 37 or other suitable fastener. Each of the forming arms has a cam follower wheel 53 attached to the arm by means of a cam follower pin 54. The cam follower wheel is attached so that it is capable of rotating freely around the cam follower pin 54. In order to obtain this rotation, it is preferable to fix a plastic washer 55 between the cam follower wheel and the forming arm. The inner forming arm, that is, the forming arm closest to the bracket is attached to the bracket 33 so that it is flush with the bracket. Adjacent the outer or other forming arm is a pressure plate 40 which will force the outer forming arm against the inner forming arm. A spring 39 is coiled in such a fashion that the bushing 38 may pass through the coil. The ends of the spring are bent over pins 41 which tends to force the forming arms apart. A slot 68 may be cut into the pin 41 to receive the end of the spring and hold it securely. This is best shown in FIGS. 7 and 8. The bushing 38 lies between the bolt 37 and the spring 39 to prevent the spring from binding. The bushing also exerts pressure on the plate 40, thereby holding the forming arms in a pair against each other. There is a cutout portion 43 in the bracket 33 to accommodate the follower wheel on the outer forming arm as shown in FIG. 8. There is also a cutout portion 35 in the outer forming arm to allow clearance for the pin 41 on the inner forming arm. Each of the openings in the forming arms has a lower surface 61 and an upper surface 62. When the forming arms are in the fully opened position, the lower surfaces 61 of the arms co-act in such a way as to form a relatively flat surface to receive the stuffed casing as it is introduced into the machine. This is best shown in FIG. 2.

As the mounting plate attached to collar 63 is rotated, the cam followers 53 will open or close the forming arms, depending on the high and low surfaces on the actuator cams 42. FIGS. 4–7 show the opening formed between the forming arms becoming narrower as the forming arms are brought together. The action of the forming arms in the formation of the link end will be discussed in greater detail below.

There is a slot 64, which is relatively narrow, formed at the closed end of the opening of each of the forming arms. The presence of the slot 64 prevents excessive pressure on the casing when the meat emulsion is being squeezed out of the casing by the forming arms. The empty casing can move out of the V-notch of the forming arms and into the slot 64 at the apex of the V-notch. At the end of the slot, there is a cutting surface 56 which is capable of interacting with the corresponding cutting surface 56 on the other forming arm in a given pair to cut the sausage casing at the appropriate point in the cycle. The cutting surface is cut at an angle of from about 10° to 45°. The cutting action is a scissors-type action. The interaction of the cutting surfaces is best shown in FIG. 9. The preferred method of forming the slot and the cutting surface is with a replaceable insert, which is shown in greater detail in FIG. 17. The thickness of the insert is greater than the thickness of the forming arm into which the insert is placed. The outer surface, that is the surface away from the cutting edge of the insert, has a truncated, conical portion which is thicker than the portion of the insert that is fitted into the forming arm. The purpose of the truncated, conical portion is to aid in pushing the filling within the casing in a longitudinal direction away from the cutting blade as the forming arms are moved toward each other, as will be explained below.

To assist in the positioning of the casing in the center area of the forming and cutting arms, stabilizers 70 may be attached to the arms. The stabilizers prevent the filled casing from moving out of alignment with the slot and cutting surfaces as the arms are closing. They also assist in pushing the filling material within the casing in a longitudinal direction away from the insert. This gathers more casing and improves the physical appearance of the end of the link. Representative configurations of the stabilizers are shown in FIGS. 11–14 of the drawing. The stabilizers 70 are attached to the forming arm by a thread 71 or other means. As shown in FIGS. 13 and 14, the stabilizers have a portion 72 attached generally perpendicular to the side of the forming arm. The perpendicular portion 72 is of sufficient length to clear the thickness of the other forming arm in the pair. The stabilizer in one forming arm acts in conjunction with the slot 64 of the other forming arm of the same pair to align the casing with the cutting surfaces.

As previously indicated, the present apparatus may also be used to sever individual links from a string of connected links which have been formed on other equipment. Although a cam of the configuration shown in FIG. 16 may be employed to sever performed links, a cam of the configuration shown in FIG. 15 is specifically designed for use in the apparatus when the apparatus is employed to sever preformed links. The cam has a relatively long dwell area, more than 180°, and a relatively rapid rise. The long dwell area of the cam represents the open position of the forming and cutting arms. As the cam rises, the forming and cutting arms move toward each other and then overlap, thereby cutting the link.

The preferred cam configuration that is employed when the apparatus is used to form and cut sausage links is shown in FIG. 16. The cam surface has a relatively short dwell, 90° to 120°, which represents the position where the forming arms are fully opened. As the cam followers rotate around the cam, in the direction of the arrow in FIG. 16, there is a rise in the cam. This rise forces the forming and cutting arms to close to begin the forming of the link end. The next portion of the cam surface is a dwell area which gives the meat emulsion the opportunity to flow away from the point of contact of the forming and cutting arms. The next portion of the cam surface is a gradual rise which slowly moves the forming and cutting arms into an overlapping relationship to cut the newly formed link end from the remainder of the casing. This is shown by the arrow directed to the surface of the cam in FIG. 16. The overlapping configuration is the highest point in the cam. The cam surface then returns to the lowest dwell area which represents the fully opened position of the forming and cutting arms.

Another possible cam configuration for the forming and cutting mode of operation would be a uniform rise to the highest point on the cam and after cutting the cam would again return to the lowest dwell area.

The apparatus can be readily disassembled to be cleaned. By loosening the bolts 66, the brackets 33 with the attached forming arm assemblies can be separated from the apparatus and individually cleaned in an appropriate manner.

The length of the sausage to be formed by the apparatus is determined by the distance between the cutting inserts in adjacent pairs of forming arms when the inserts are in a closed position. The forming arms are mounted on a bracket 33 which in turn is mounted on the mounting or carrying plate 32 by bolts 66. If the bracket is moved radially on the mounting plate away from its center, the distance between adjacent forming arms will be increased, and thus the length of a sausage link made on the apparatus will be increased. Moving the bracket radially away from the center will also necessitate use of an appropriately larger pair of cams 42 to give the full range of motion to the forming and cutting arms. It is also possible to remove alternate forming arm assemblies to obtain a sausage link which is twice the length of the link formed when all forming arms are present. Moving the brackets radially toward the center of the mounting plate and installing smaller cams will result in shorter length of the sausage link.

The device is, therefore, quite simple to modify in order to form sausage links of various sizes. In addition, since the space between the forming arms, when the forming arms are in a fully opened position, is quite large, it is possible to process sausages of varying diameters on the apparatus without any additional adjustments.

The configuration of the cutting inserts can be varied considerably. FIGS. 17-33 show various configurations which are suitable for use in the present apparatus. The cutting inserts shown in the drawings, all have a cylindrical portion and a truncated, conical portion. The cylindrical portion has a thickness which is approximately equivalent to the thickness of the forming arm into which the cutting insert is press fitted. The truncated, conical portion of the cutting insert extends beyond the forming arm and gives the forming arm additional thickness in the area of the cutting insert. This additional thickness tends to push away the meat emulsion within the casing as the forming arms carrying the inserts are closed. The meat emulsion is pushed from the casing in a longitudinal direction prior to the cutting action of the forming arms to insure that none of the meat emulsion is lost and thereby wasted.

Other configurations with the thickness of the insert equal to or less than the thickness of the forming arm and with a concave, convex or flat surface can be used for certain cutting applications.

If it is desired to alternately cut the links, that is to preform the forming but not the cutting on certain links, an additional style of cutting insert may be used. The slots 64 are lengthened such that back cutting edges do not overlap when the forming arms are in the fully closed position. This configuration could be used to cut every second link formed.

OPERATION TO SEVER PREFORMED LINKS

When the present apparatus is used to sever individual sausage links from a preformed string of connected links, the cam shown in FIG. 15 is employed. The individual links in the string are connected by casing from which the meat emulsion has been removed by the link forming machine, and the sausages are generally but not necessarily fully cooked or cured. The string of connected links is fed by hand into the open space between a pair of forming arms. The link end between the first and second links in the string is placed between a pair of forming and cutting arms 34. A pair of forming and cutting arms are termed a forming or cutting assembly. The mounting plate 32 is then rotated by hand or by the motor drive. As the mounting plate is rotated, the follower wheels 53 will ride onto the rise in the cam and force and forming and cutting arms 34 toward one another. As the arms 34 move toward one another, they will contact the end portions of the sausage links on either side of the arms and force the end portion of the links away from the forming and cutting arms. The action of the forming arms pushing away the end portion of the links centers the unfilled casing between adjacent links into the slot 64 of the forming and cutting arms. As the forming and cutting arms continue their movement into an overlapping relationship, the cutting edges at the close end of the slot cut the unfilled casing between the links and sever the leading link from the remainder of the links in the string. As the mounting plate continues to rotate, the trailing links are severed from the string in a similar manner.

As shown in FIG. 15, the rise in the cam is at first rapid, and then there is a gradual rise until the cutting is complete. The arrow directed to the surface of the cam in FIG. 15 shows the high point on the surface of the cam where the cutters overlap and sever the link. The purpose of the gradual rise portion of the cam is to allow the casing between adjacent link ends to be placed in the proper position to be cut. As the forming arms move toward one another, the preformed link end will be forced away from the closing forming arms and away from the slot 64. The portion of the casing between adjacent links will be positioned into the cutting edge at the end of slot 64. The sausage link end, which is on the downstream end of the chain of links, can be forced forward since the preceding link has been completely severed, and the forming arms that severed that link are completely opened. The sausage link end which is connected to the series of links to be severed can be forced backwards as the trailing pair of forming arms is not yet closed. The movement of the downstream link end forward and the succeeding link backward centers the tie between the links into the cutting surfaces thereby cutting the links in the tie and not through any of the meat emulsion at the end of a link.

OPERATION TO FORM AND SEVER LINKS

The operation of the apparatus to form and sever links is as follows: It should be recognized in the following description that the meat or other emulsion within a sausage casing is relatively fluid and can flow if pressure is applied to the emulsion. The stuffed sausage casing 58, which has been previously filled by the normal sausage making techniques, is fed over the rollers 52, which are mounted on the support arm 50, and into and between a pair of opened forming arms 34. The casing will rest on the overlapped lower portion 61 of the forming arms. As the mounting plate is rotated through the rotation of the collar 63 the forming arms will be cammed toward one another by the action of the cam followers 53 following the surface of the cams 42. As the forming arms approach one another, the dimensions of the space between them is reduced, as shown in FIGS. 4-7. As the forming arms contact the casing, the meat emulsion within the casing will be moved within the casing away from the point of contact of the forming arms. The closing of the forming arms exerts a transverse pressure on the point of contact which effectively squeeze the meat emulsion away from the casing as the space defined by the closing forming arms is diminished. This is depicted in FIGS. 4 through 7. In FIG. 4-7, the stuffed casing is shown in phantom by the large circle. As the forming arms contact the casing, pressure is exerted against the surface of the casing deforming the casing into the shape shown by the cross-hatched area in FIG. 4 and squeexing the meat emulsion within the casing away from the point of contact. As the forming arms close further, FIG. 5, the space-defined by the arms is reduced even more and the meat emulsion is squeezed further away from the point of contact. At approximately this point in the cycle there is a dwell area in the cam which allows the meat emulsion to satbilize and come to a steady state and relax any pressure on the casing caused by the squeezing action of the forming arms. As the mounting plate is continually rotating, the cam followers reach a higher point in the cam which pushes the forming arms even closer together until the only space between a pair of forming arms is the space which is represented by the rectangular slot 64 at the base of the notch in each of the forming arms. This is shown in FIG. 6. Continued rotation of the mounting plate brings the forming arms even closer together, and the meat emulsion within the casing adjacent to the forming arms is ushed away from the casing by the truncated, conical surface of the insert 36. The truncated, conical surface pushes the meat emulsion in generally the longitudinal direction along the length of the casing further away from the closing forming arms. At approximately this same point in the cycle, the stabilizers 70 will contact the casing. The contact of the stabilizer will also exert a force on the meat emulsion in the longitudinal direction of the casing. The stabilizers 70 also prevent the casing from moving out of alignment with the slot 64 and the cutting surfaces. The casing that has been emptied of the meat emulsion is now positioned in the slots 64. The forming arms again, by the action of the cam followers following the cam to its highest point, push the forming arms to an overlapping configuration which causes the cutting surfaces in the inserts to overlap and cut the casing in a scissors action as shown in FIG. 7.

At this point, the finished sausage link 59 will drop from the apparatus and can be collected on a conveyor, not shown, or any other suitable device.

As described above, the stabilizing arms shown in FIGS. 11-14, provide alignment of the filled casing in relationship to the forming arms and cutting inserts. The stabilizing arms also assist in pushing the casing into slot 64 in the opposing forming arm insert 36. The result of these actions of the stabilizers further assists in forcing the emulsion away from the link ends as the link ends are being formed and before they are cut. The meat emulsion is forced away from the casing as the casing is gathered into the slot 64. The casing covers the rounded link end thus formed and the casing is cut in an area from which the meat emulsion has been removed.

As the mounting plate is continually rotated, the cam followers move through the high point on the cam to a lower segment of the cam which allows the forming arms to be separated by the action of the spring 39. The forming arms are now ready to begin a new cycle.

In the process of making sausage links with the apparatus described above, the filled casing is first gripped by the closing forming and cutting arm assemblies and constructed by the progressive reduction in the space defined by the opposing V-shaped openings. The rate of constriction is determined by the slope of the cam and the shape of the arms. As the V-shaped openings overlap and the casing is forced into the slot, the major part of the constriction is complete and a second phase gathering of casing and forming of the link end begins.

As the slot in the opposing arms close and overlap, the emulsion is further moved away from the link end by the pressure of the conical insert directed longitudinally against the link. When the inserts overlap completely to sever the link, the emulsion has been pushed from the end and enough casing has been gathered to produce a finished link end essentially covered by casing and permanently adhered to the sausage.

I claim:

1. Apparatus for forming individual sausage links from stuffed casing comprising a plurality of pairs of forming arms attached to a mounting means which is capable of moving in an endless cycle, said pairs of forming arms being capable of opening and closing at predetermined points in the cycle, each of the forming arms in a pair of forming arms having an inner surface which faces the inner surface of the other forming arm in the same pair of forming arms and an outer surface which is opposite the inner surface, each of such forming arms having at the end of said arm an opening which faces the opening in the other forming arm in the same pair, a stabilizer affixed to at least one forming arm in each pair of forming arms, a portion of the stabilizer extending beyond the outer surface of the other forming arm in the same pair if forming arms, so that the stabilizer will not contact the opposing forming arm when the forming arms are brought into a closed position, the stabilizer being positioned to contact the stuffed casing and guide the casing into the closed end of the opening in said forming arms.

2. The apparatus of claim 1 in which the stabilizer has a V-shaped portion, the apex of the V-shaped portion being aligned with the closed end of the opening in the forming arms.

3. The apparatus of claim 1 in which the stabilizer is affixed to the inner surface of a forming arm, and a portion of the stabilizer is perpendicular to said inner surface, said perpendicular portion having a length greater than the thickness of a forming arm.

4. The apparatus of claim 3 further comprising cutting means to separate a sausage link from the casing after the sausage link has been formed.

5. Apparatus for forming sausage links from stuffed casing comprising a plurality of pairs of forming arms attached to a mounting means which is capable of moving in an endless cycle, said pairs of forming arms being capable of opening and closing at predetermined points in the cycle, each of the forming arms in a pair of forming arms having an inner surface which faces the inner surface of the other forming arm in the same pair of forming arms and an outer surface which is opposite the inner surface, each of such forming arms having at the end of said arm an opening which faces the opening in the other forming arm in the same pair, a slot at the closed end of each of said openings, a stabilizer affixed to the inner surface of each forming arm, a portion of each stabilizer extending beyond the outer surface of the other forming arm in the same pair of forming arms, the stabilizer being affixed to each forming arm so that it will not contact the opposing forming arm when the forming arms are brought into a closed position, the stabilizer being positioned to contact the stuffed casing and guide the casing into the closed end of the opening in each forming arm.

* * * * *